Sept. 6, 1932.          H. D. CROFT          1,875,564
                      LUBRICATING SYSTEM
                      Filed Jan. 13, 1930
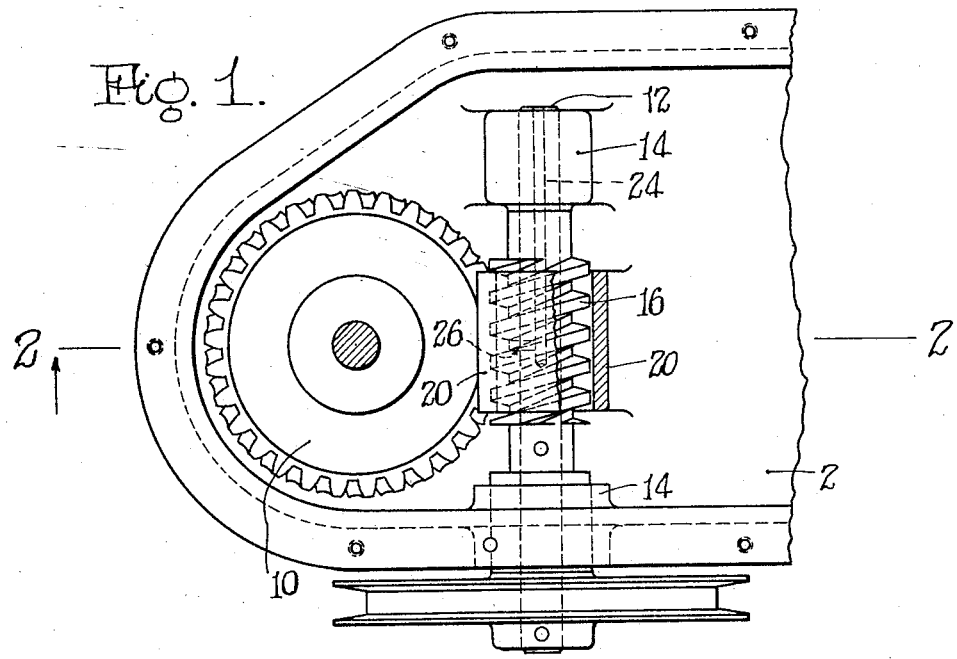
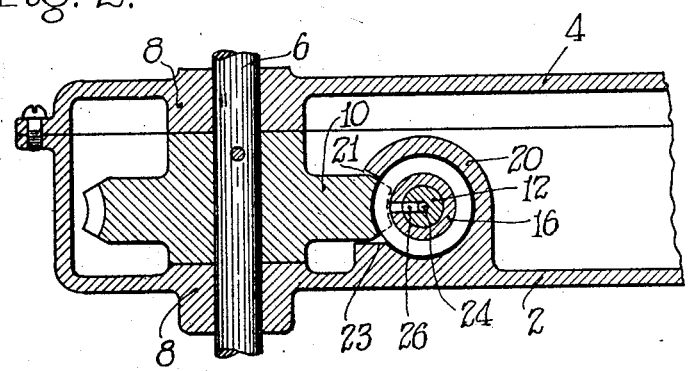
INVENTOR.
Hiram D Croft
BY Walter C Ross
his  ATTORNEY.

Patented Sept. 6, 1932

1,875,564

UNITED STATES PATENT OFFICE

HIRAM D. CROFT, OF SPRINGFIELD, MASSACHUSETTS, ASSIGNOR TO PERKINS MACHINE & GEAR COMPANY, OF WEST SPRINGFIELD, MASSACHUSETTS, A CORPORATION OF MASSACHUSETTS

LUBRICATING SYSTEM

Application filed January 13, 1930. Serial No. 420,537.

This invention relates to improvements in lubricating systems and is directed more particularly to improvements in apparatus for lubricating parts which intermesh and rotate at high speeds.

Where gears rotate at high speed it is difficult to properly lubricate the intermeshing teeth thereof because the high speed and resulting centrifugal action tends to throw lubricant from the teeth.

It is the principal object of this invention to provide means to insure proper lubrication of the intermeshing teeth of gears and the like and is accomplished by means of the novel combination and arrangement of parts to be hereinafter more fully described in connection with the accompanying drawing, in which:

Fig. 1 is a plan view of a housing with its cover removed to show the various features of the invention, and Fig. 2 is a sectional view taken in the line 2—2 of Fig. 1.

Referring to the drawing the invention will now be described in detail.

In the drawing 2 and 4 represent parts of a housing which may be secured together to provide a closed chamber and support. A shaft 6 rotatable in bearings 8 of the housing carries a worm-gear 10 which, in the form of the invention shown, may be a driven element. A shaft 12 rotatable in bearings 14 may be the driving shaft and serves as a journal for and carries a worm 16 which meshes with the worm-gear 10.

It is desired to lubricate the intermeshing parts of the worm-gear and worm which is increasingly more difficult accordingly as the rotative speed of the gear and worm is increased. As has been stated the centrifugal action caused by the rotative movement throws lubricant from the very parts where lubricant is essential.

To overcome this according to the invention, the following is provided. A shroud 20 is carried by the support or housing and is located to extend around and enclose the worm 16. It is extended as at 21 and 23 so as to overlie the intermeshing points of the gear and worm. Preferably the inner surface of the shroud is closely adjacent the surfaces of the gear and worm so as to not only prevent lubricant from being thrown from the parts, but to hold a film of lubricant thereagainst as they rotate.

The shroud may be a part of the housing and properly machined on its inner side for the purpose intended or it may be a separate member suitably fixed to the housing and properly disposed with reference to the rotating parts.

The housing may function of course as a reservoir for lubricant and when filled or partly filled lubricant will enter through an end of the shroud or be drawn thereinto by the rotation of the worm and gear. The shroud is adapted to retain the lubricant and prevent it being thrown from off the intermeshing parts and in that way functions to thoroughly lubricate the rotating elements in the desired manner.

It is not always possible to keep the housing completely filled with lubricant and of course is not at all necessary in connection with the invention as lubricant will enter the shroud and be carried by one or both of the intermeshing members to the point it is desired to lubricate.

As a further feature the shaft 12 and worm are provided with passageways 24 and 26 which are in communication with one another so that lubricant may enter the shaft and be delivered by the worm to a point within the shroud. This will insure lubricant being brought to the intermeshing parts where it is retained by the shroud.

While an intermeshing worm and gear are shown for purposes of explaining the invention, it will be readily obvious that the invention is adapted for use in connection with various forms of intermeshing gear elements such as spur or bevel gears.

Various changes may be made in the form of the invention without departing from the spirit and scope thereof and therefore it is desired to be limited, if at all, by the appended claims rather than the foregoing description.

What is claimed is:

1. Lubricating system comprising in combination, a support, a worm and worm-gear in meshing engagement journalled in said support and a shroud carried by said support embracing said worm and the intermeshing parts of said worm and gear, the said shroud having an open end to permit the passage of lubricant into and out of said shroud.

2. Lubricating system comprising in combination, a support, a worm gear journalled therein, a worm in meshing engagement with said gear having a journal rotatable in said support, a shroud carried by said support embracing said worm having an open end to provide a passageway between the worm and wall thereof and the said worm and journal provided with communnicating passageways extending from the intermeshing parts of said worm and gear to the outer end of said journal.

3. A lubricating system comprising in combination, a supporting housing, a worm and a worm wheel journaled for rotation therein and disposed in intermeshing engagement with each other, a shroud arranged in the housing, said shroud being curved to closely surround the worm, the open side of the shroud overlying the adjacent portion of the worm wheel, said shroud directing the lubricant to the intermeshing parts of the worm and the worm wheel, the ends of the shroud being open to permit the lubricant to be fed axially by the worm to the intermeshing parts of the worm and worm wheel.

In testimony whereof I affix my signature.

HIRAM D. CROFT.